(12) United States Patent
Battles et al.

(10) Patent No.: US 8,538,578 B2
(45) Date of Patent: Sep. 17, 2013

(54) METHOD AND APPARATUS FOR NON-LINEAR UNIT-LEVEL SORTATION IN ORDER FULFILLMENT PROCESSES

(75) Inventors: Jon S. Battles, Independence, MO (US); Ian J. Wrightson, Issaquah, WA (US); David H. Clark, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/441,718

(22) Filed: Apr. 6, 2012

(65) Prior Publication Data
US 2012/0215344 A1    Aug. 23, 2012

Related U.S. Application Data

(63) Continuation of application No. 11/768,529, filed on Jun. 26, 2007, now Pat. No. 8,170,712.

(51) Int. Cl.
*G06F 7/00* (2006.01)

(52) U.S. Cl.
USPC ........................................................ 700/216

(58) Field of Classification Search
USPC .................. 700/216, 230, 223, 224
See application file for complete search history.

(56) References Cited

U.S. PATENT DOCUMENTS

| | | | |
|---|---|---|---|
| 4,561,060 A | 12/1985 | Hemond | |
| 5,246,332 A | 9/1993 | Bernard, II et al. | |
| 5,301,790 A | 4/1994 | Prydtz et al. | |
| 5,388,706 A | 2/1995 | Baldur | |
| 5,934,413 A | 8/1999 | Konig et al. | |
| 6,259,967 B1 | 7/2001 | Hartlepp et al. | |
| 6,289,260 B1 | 9/2001 | Bradley et al. | |
| 6,401,936 B1 * | 6/2002 | Isaacs et al. | 209/656 |
| 6,484,886 B1 * | 11/2002 | Isaacs et al. | 209/539 |

(Continued)

FOREIGN PATENT DOCUMENTS

| | | |
|---|---|---|
| EP | 1693319 | 8/2006 |
| JP | 2002029613 | 1/2002 |
| WO | 2006098943 A1 | 9/2006 |

OTHER PUBLICATIONS

Office Action from Japanese Patent Application No. 2010-514989 mailed Feb. 5, 2013, (English Translation and Japanese Versions), pp. 1-11.

(Continued)

*Primary Examiner* — Ramya Burgess
(74) *Attorney, Agent, or Firm* — Robert C. Kowert; Meyertons, Hood, Kivlin, Kowert & Goetzel, P.C.

(57) ABSTRACT

A flexible, non-linear, unit-level sortation system for sorting mixed collections of items into orders. Collections of unsorted items for fulfilling requests are delivered to one or more singulation stations. At a singulation station, individual units of items are selected from a collection, associated with particular conveyance receptacles, and placed into the receptacles, with one and only one unit per receptacle. The receptacles may be inducted into a conveyance mechanism under the direction of a control system. The receptacles are not fixed to the conveyance mechanism. The control system may direct the conveyance mechanism to route the receptacles to a particular one of one or more sorting stations. At a sorting station, the units may retrieved from receptacles and placed into locations corresponding to particular orders under control or direction of the control system. The conveyance mechanism may, but does not necessarily, return empty conveyance receptacle to a singulation station.

20 Claims, 10 Drawing Sheets

(56) References Cited

U.S. PATENT DOCUMENTS

| | | |
|---|---|---|
| 6,694,220 B1 | 2/2004 | Tanz |
| 6,789,660 B1 * | 9/2004 | Bruun et al. ............... 198/347.1 |
| 2004/0073333 A1 * | 4/2004 | Brill .............................. 700/224 |
| 2006/0151288 A1 * | 7/2006 | Reznik et al. ............. 198/370.1 |
| 2007/0209976 A1 | 9/2007 | Worth et al. |
| 2007/0246328 A1 * | 10/2007 | Reznik .......................... 198/444 |
| 2008/0093273 A1 * | 4/2008 | Stemmle ....................... 209/584 |
| 2008/0207114 A1 * | 8/2008 | Tuttle ........................... 455/3.01 |

OTHER PUBLICATIONS

International Search Report and Written Opinion for PCT/US2008/067485, mailed Sep. 16, 2008.

\* cited by examiner

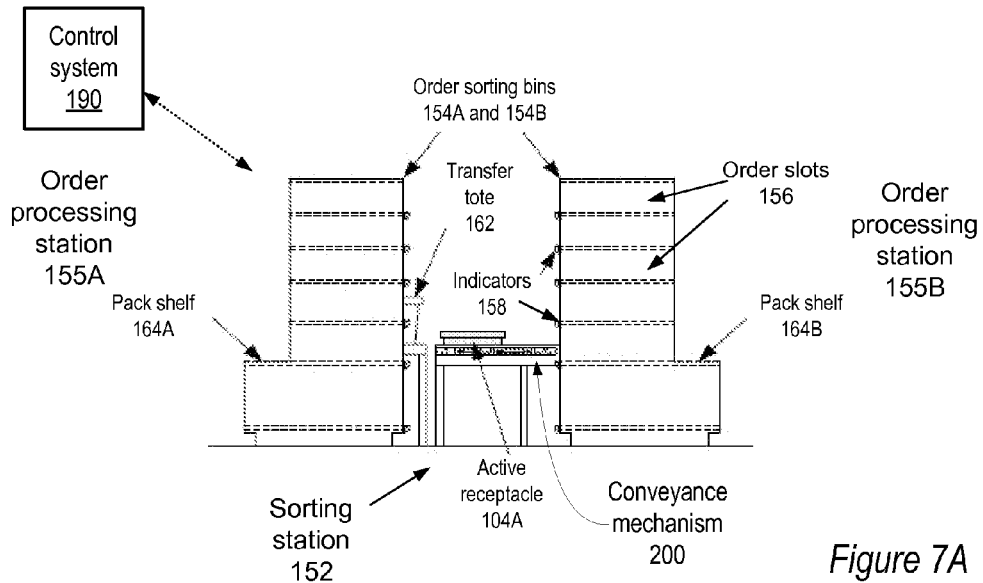
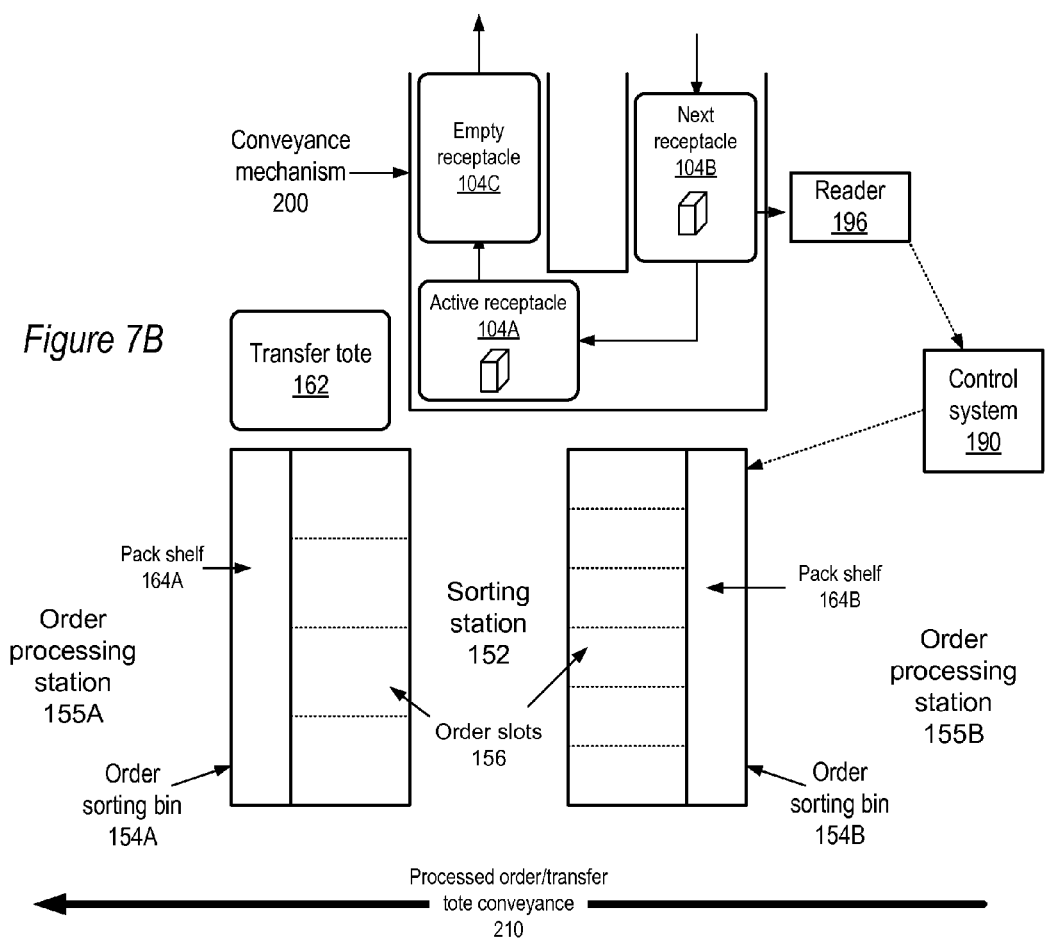

METHOD AND APPARATUS FOR NON-LINEAR UNIT-LEVEL SORTATION IN ORDER FULFILLMENT PROCESSES

This application is a continuation of U.S. application Ser. No. 11/768,529, filed Jun. 26, 2007, which is incorporated by reference herein in its entirety.

BACKGROUND

1. Field of the Invention

This invention relates to distribution systems, and more particularly to materials handling facilities, such as warehouses or fulfillment centers.

2. Description of the Related Art

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to herein as materials handling facilities). The inventory items are ordered from one or more vendors, received at the materials handling facilities as inbound shipments, and stocked in inventory of the materials handling facilities. In an order fulfillment process, orders for items may be received from customers of the distributor. Units of the ordered items are picked from various locations in the inventory in the materials handling facilities, processed for shipping, and shipped as outbound shipments to the customers.

The order fulfillment process may include a sortation process, in which mixed batches of units picked for orders are sorted into their respective orders. For example, requests (e.g., orders) for items from requestors may be divided among multiple pickers, who then pick mixed batches of items. The orders may be subdivided among the pickers; therefore, two or more of the pickers may pick items for one order. Consequently, a sort operation to select the proper units of items for given orders from the aggregations of units items returned by each respective picker is required. Conventionally, sorting may be performed using automated sorting mechanisms or manual sorting systems. Automated sorting mechanisms for sorting certain types of inventory items according to individual orders include, but are not limited to, the Crisplant® sorter, Eurosort® sorters, and automated sorting mechanisms offered by other vendors. Using an automated sorting mechanism, batches or a stream of incoming picked items for multiple different customer orders are received at the automated sorting mechanism and sorted by the automated mechanism according to individual orders.

In typical automated sorting mechanisms, individual units of items are inducted from picked batches of mixed items directly onto the sortation mechanism into carriers (e.g., tilt trays) that are fixed to the sortation mechanism. Thus, typical automated sorting mechanisms that are used in materials handling facilities tend to be linear sorting systems. Linear sorting inducts or places individual units of items from picked batches of items (referred to as singulation) onto an individual tray or transport mechanism that is a fixed component of a linear piece of automated equipment. All of the trays or transport mechanisms are connected in a linear sequence (typically in a circle or oval continuously-running loop). An item is placed directly onto a carrier of the automated sorting mechanism. Linear sorting systems thus tend to be limited in velocity, total capacity, and the size and types of items that can be sorted.

Linear automated sorting mechanisms are typically expensive in both cost and floor area. Existing linear automated sorting mechanisms tend to not be flexible, and typically do not scale well as inventory throughput demands increase, since implementing a fractional solution is often impractical if not impossible. For example, to address a 30-40% increase in order throughput requirement may require purchasing an entire new sorting mechanism, effectively doubling throughput capacity despite leaving 60-70% of the new capacity unutilized, while also taking up at least twice as much floor space.

Shoe Sorters

The sliding shoe sorter is a high-speed automated sortation system for channeling and sorting medium size items, totes, and cartons. Operating at speeds up to 427 fpm, the shoe sorter can process as many as 9,000 pieces per hour depending on load length. Bi-directional shoes allow items to be offloaded to both sides of the sorter, improving space efficiency while providing greater design flexibility.

SUMMARY

Various embodiments of a flexible, non-linear, unit-level sortation system are described. Embodiments may facilitate the sortation of individual units of items, picked from discrete inventory locations within a materials handling facility, into orders to fulfill requests from customers. In embodiments, collections of unsorted items for fulfilling requests (e.g., customer orders) are delivered to one or more singulation stations. At the singulation stations, individual units of items are pulled or selected from the collection of items, associated with particular conveyance receptacles, and placed into the receptacles, with one and only one unit per conveyance receptacle. Each unit of an item is placed into a single "floating" tray, container, or tote (referred to herein as a conveyance receptacle). The conveyance receptacle includes a receptacle identifier that uniquely identifies the receptacle in the materials handling facility. The receptacle identifier may be indicated by a tag, sticker, device, etc. that may be attached to or integrated with the conveyance receptacle. An item placed into a conveyance receptacle may be associated with the conveyance receptacle, for example, by manually or automatically reading or scanning an item identifier from the item and the receptacle identifier from the receptacle using a mobile or fixed scanner or reader.

The conveyance receptacles may be inducted into a conveyance mechanism, which may be under the direction of a control system. The control system may, through various control mechanisms, direct the conveyance mechanism to route the conveyance receptacles to particular destinations within the materials handling facility. In one embodiment, a destination may be a particular one of one or more sorting stations, where the individual items may be manually or automatically retrieved from the conveyance receptacles and manually or automatically placed into locations corresponding to particular orders under control or direction of the control system. In one embodiment, at or near the sorting station, the receptacle identifier may be manually or automatically read or scanned form the conveyance receptacle. In one embodiment, the control system may, in response to the receptacle identifier being read or scanned into the control system, activate an indicator associated with a location to indicate to an operator that the location is where the unit is to be placed.

Once a conveyance receptacle is emptied at its destination, the conveyance mechanism may, but does not necessarily, return the empty conveyance receptacle to a singulation station. The control system may direct the conveyance mechanism to return the empty conveyance receptacle to a particular one of one or more singulation stations, or alternatively may direct the conveyance system to route the empty conveyance receptacle to some other destination. At a singulation station, a returned empty conveyance receptacle may be associated with another item, receive a unit of the item selected from a collection, and then be conveyed by the conveyance mechanism back to the singulation station or to another destination under direction of the control system. Alternatively, empty conveyance receptacles may be removed from the conveyance mechanism at the sorting station(s), singulation station(s), or at other locations along or destinations of the conveyance mechanism.

Conveyance receptacles are described as "floating" because of their non-linear relationship to automated equipment. Conveyance receptacle are not fixed to or fixed components of, the conveyance mechanism or any other equipment, and each conveyance receptacle has a non-linear relationship to other conveyance receptacles active in the system (i.e., there is no necessary ordering of conveyance receptacles). Conveyance receptacles may be removed from or added to the non-linear, unit-level sortation system, and may be arbitrarily arranged in the sortation system. Further, a variety of automated and/or non-automated equipment may be used to implement the non-linear, unit-level sortation system using the conveyance receptacles; the use of conveyance receptacles that are each associated with individual units of items does not depend on the use of any particular equipment to convey the receptacles and/or to sort the units contained therein into orders. In addition, different sizes and/or configurations of conveyance receptacles may be handled by the non-linear unit-level sortation system without requiring a significant change or modification, if any, of automated or other equipment in the system.

BRIEF DESCRIPTION OF THE DRAWINGS

FIGS. 7A and 7B illustrate a side view and a top view, respectively, of an exemplary sorting station and associated order processing stations according to one embodiment.

Figure 1:
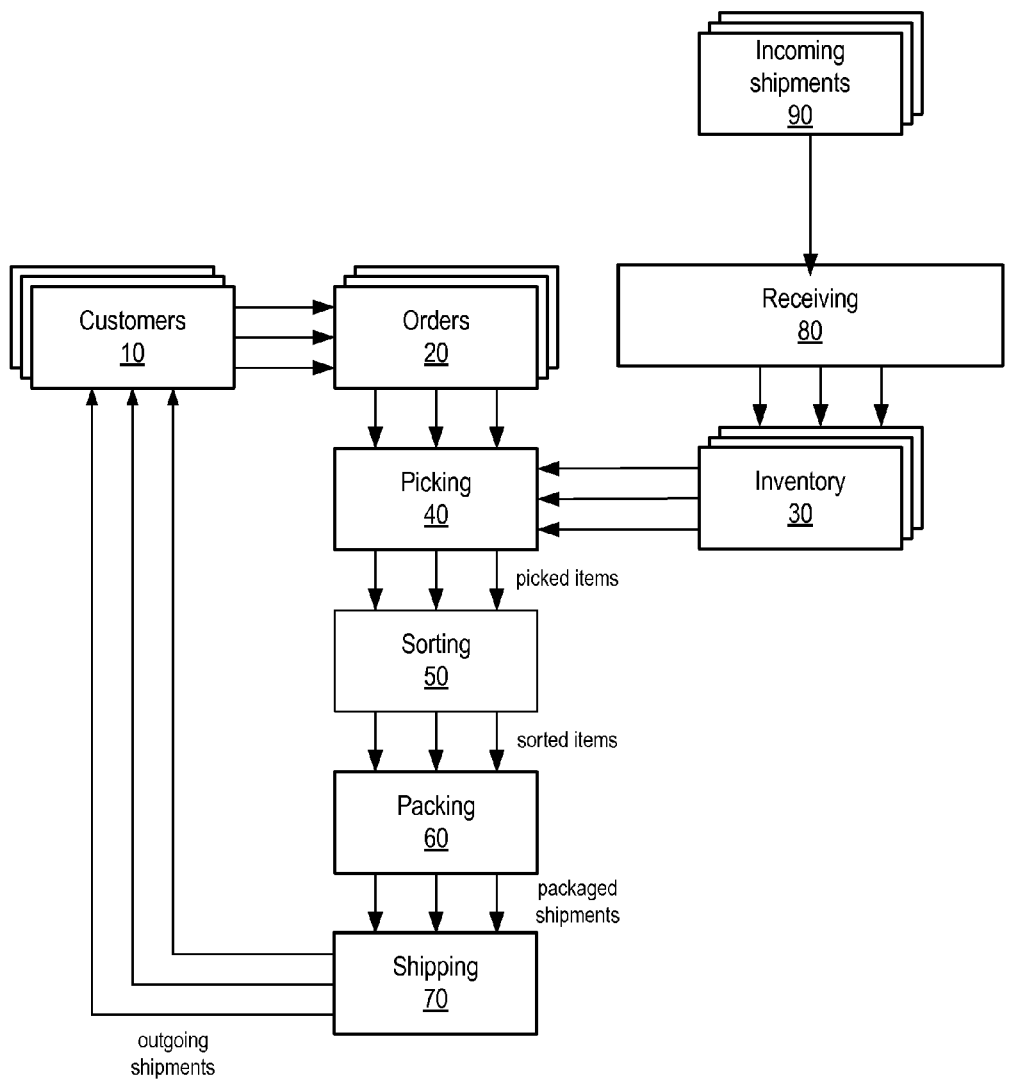
FIG. 1 illustrates a logical representation or view of the operation of a materials handling facility in which embodiments of the non-linear, unit-level sortation system may be implemented.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a method and apparatus for non-linear unit-level sortation in an order fulfillment process, for example order fulfillment processes in materials handling facilities, are described. A flexible, non-linear, unit-level sortation system is described which facilitates the sortation of individual units of items, picked from discrete inventory locations within a materials handling facility, into orders to fulfill requests from customers. In embodiments, a picking process delivers batches, or a stream, of unsorted items for fulfilling requests to one or more singulation stations. At a singulation station, individual units of items are pulled or selected from a mixed collection of items, associated with particular conveyance receptacles, and placed into the receptacles, with one and only one unit per conveyance receptacle. The conveyance receptacles are inducted into a conveyance mechanism under the direction of a control system, which then, through various control mechanisms, directs the conveyance receptacles to particular destinations within the materials handling facility. As will be described below, in one embodiment, a destination may be a sorting station, where the individual items may be manually or automatically retrieved from the conveyance receptacles and manually or automatically placed into locations (e.g., slots or bins) corresponding to particular requests (e.g., customer orders). Once a conveyance receptacle is emptied at its destination, the conveyance mechanism may, but does not necessarily, return the conveyance receptacle to a singulation station.

In linear sortation systems, individual items are inducted to or placed on an individual tray or transport mechanism that is a fixed component of a linear piece of automated equipment. All of the fixed trays or transport mechanisms are connected in a linear sequence. A unit of an item is placed directly on the sorting mechanism. The linear sequencing and fixed trays/transport mechanisms of linear sortation systems limit the speed of the equipment, the types of products that can be placed on the system, and the overall total capacity of the system. These limitations may result in significant costs for both equipment and labor to operate linear sortation systems.

In embodiments of the non-linear, unit-level sortation system, each unit of an item is placed into a single "floating" tray, container, or tote (referred to herein as a conveyance receptacle). The conveyance receptacle is associated with a receptacle identifier that uniquely identifies the conveyance receptacle in the materials handling facility. For example, each conveyance receptacle may be marked with a bar code or Radio Frequency Identifier (RFID). An item placed into a conveyance receptacle is associated with the conveyance receptacle, for example by reading or scanning an item identifier from the item and the receptacle identifier from the receptacle. Conveyance receptacles are described as "floating" because of their non-linear relationship to each other and to automated equipment. Conveyance receptacle are not fixed to or fixed components of any automated equipment, and each conveyance receptacle has a non-linear relationship to other conveyance receptacles active in the system (i.e., there is no necessary ordering of conveyance receptacles). Conveyance receptacles may be removed from or added to the non-linear, unit-level sortation system, and may be arbitrarily arranged on the sortation system. Conveyance receptacles may be removed from or added to the non-linear, unit-level sortation system at various locations on the path of the conveyance mechanism, for example at singulation stations, sorting stations, or at other locations, as necessary or desired. Further, a variety of automated equipment may be used in implementing the automation of the non-linear, unit-level sortation system using the conveyance receptacles; the use of conveyance receptacles that may each be associated with individual units of items as described herein does not depend on the use of any particular automated equipment to convey the receptacles and/or to sort the units contained therein into respective orders.

Embodiments of the non-linear, unit-level sortation system may enable the processing of orders within a materials handling facility using only one segment, batch and/or process path type, which may reduce the operating costs for sortation. Additionally, by creating a non-linear relationship between each item and its associated conveyance receptacle and the sorting mechanism, the total throughput or capacity of the sortation system is modular, and therefore capacity for the sortation system is limited only by the space available to induct additional conveyance receptacles into the non-linear unit-level sortation system.

Thus, embodiments of the non-linear, unit-level sortation system may provide improved performance in sorting items into orders in a materials handling facility when compared to linear sortation systems. In linear sortation systems, capacity/throughput increases typically require the procurement and operation of additional automated equipment, which is expensive and space consuming, and typically requires significant additional labor to operate. In contrast, in the non-linear, unit-level sortation system, inexpensive conveyance receptacles can be added to the existing system, with no need to add additional automated equipment, to increase capacity/throughput. No additional space is required for additional equipment, and less additional labor, if any, may be required to operate at the increased capacity.

The configuration of the transport mechanisms or trays in at least some linear sorting systems (e.g., tilt trays) may limit the speed at which the equipment may be operated, as some items may tend to fly off the trays at higher speeds. The configuration of the conveyance receptacles used in embodiments, e.g. trays or totes with relatively high sides, may help to prevent items from falling out of the conveyance mechanism at higher speeds, allowing the conveyance mechanism to be operated at higher speeds if necessary or desired without worrying about items falling off the mechanism.

In addition, a change in the size of items handled in the sortation process in linear sortation systems may require expensive modifications to or replacement of automated equipment. Modifying the linear sortation system equipment may result in down-time. In contrast, in the non-linear, unit-level sortation system, a change in the sizes of items handled may typically not result in the need for any change in automated or down-time for the equipment at all, as the non-linear conveyance receptacles may handle a larger variety of sizes than the fixed, linear trays of linear sortation systems, and in addition, different sizes of conveyance receptacles may be handled by and thus may be added to the non-linear system without requiring any change of, or even halt of, the automated equipment. If, for example, items that are too large for the current conveyance receptacles are introduced into the materials handling facility, then the current conveyance receptacles may be replaced with or augmented by larger conveyance receptacles. If smaller items are carried in inventory, then smaller conveyance receptacles may be used, which has the benefit of allowing increased throughput, as more conveyance receptacles can be handled by the non-linear system, which is limited only by the space available to induct additional receptacles into the system.

In embodiments of the non-linear, unit-level sortation system, non-linear sortation may include a process that may be referred to as singulation. Singulation involves either a human or a machine removing individual units of items from a collection of mixed items, placing the individual units of items each into a conveyance receptacle, with only one unit per receptacle, and associating the item with the conveyance receptacle. After a unit of an item is associated with and placed into a conveyance receptacle, the conveyance receptacle may be routed through the non-linear, unit-level sortation system to some point or location at which the item may be re-grouped with other units of items associated with the unit in the receptacle, for example other units of items indicated by a customer order or request.

FIG. 1 illustrates a logical representation or view of the operation of a materials handling facility in which embodiments of the non-linear, unit-level sortation system may be implemented. For example, this Figure may illustrate an order fulfillment center of a product distributor. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In embodiments of the non-linear, flexible sorting system, picked items may be delivered to a singulation station, where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system. An exemplary sorting station that may be a destination for conveyance receptacles is described below. A picked, packed and shipped order does not necessarily include all of the items ordered by the customer; an outgoing shipment to a customer may include only a subset of the ordered items available to ship at one time from one inventory-storing location.

A materials handling facility may also include a receiving 80 operation for receiving shipments of stock from one or more sources (e.g., vendors) and for placing the received stock into stock storage. The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities.

Figure 2:
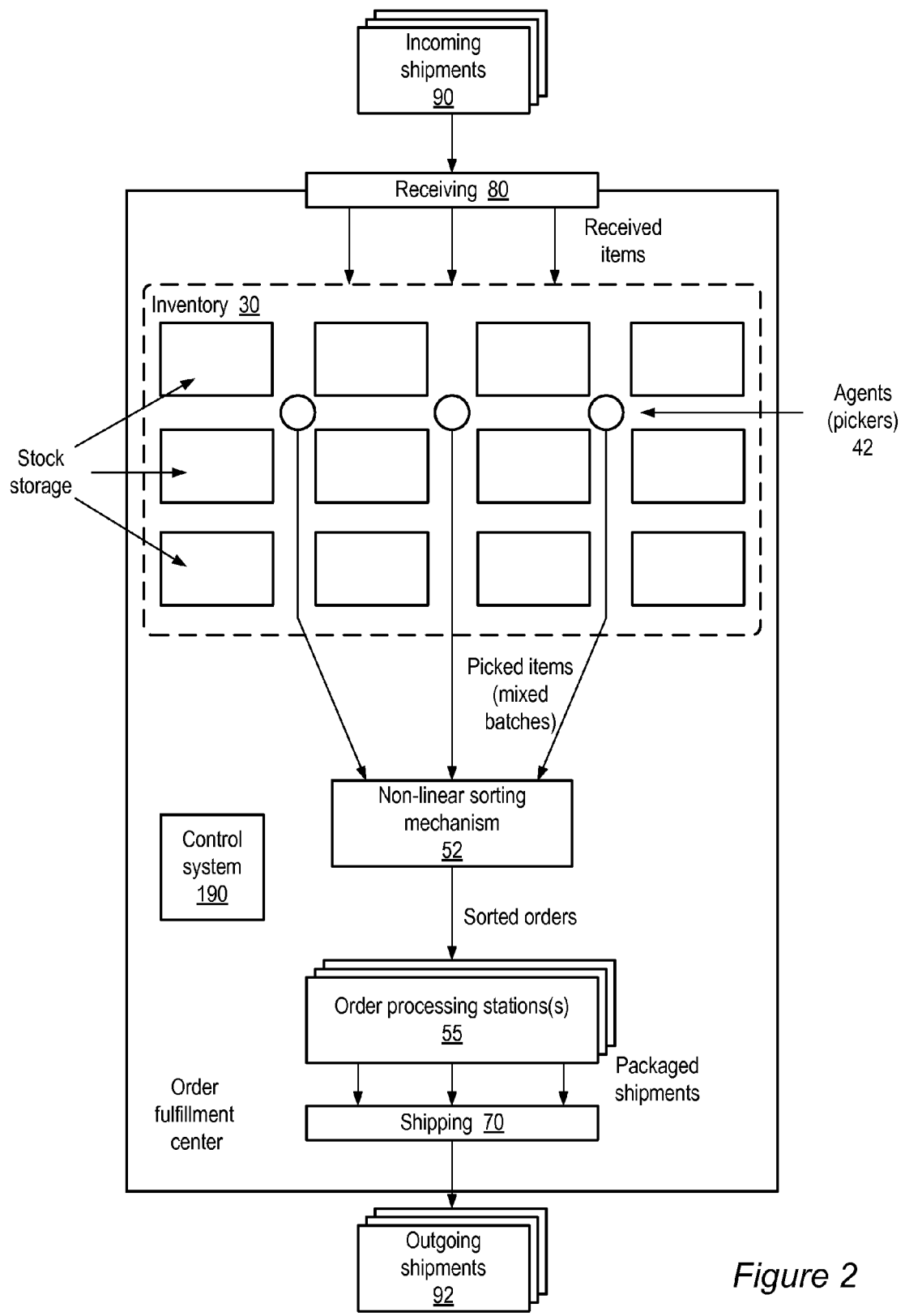
FIG. 2 illustrates an example of a physical layout of a materials handling facility, such as an order fulfillment facility or center, in which embodiments of the non-linear, unit-level sortation system may be implemented.

FIG. 2 illustrates an example of a physical layout of a materials handling facility, such as an order fulfillment facility or center, in which embodiments of the non-linear, unit-level sortation system may be implemented. At any one time, one or more agents 42 of the distributor may each be picking items from inventory 30 to fulfill portions or all of one or more requests or orders. This may result in a stream and/or batches of picked items for multiple incomplete or complete orders, which may then be delivered to an induction point for the non-linear, unit-level sortation system (non-linear sorting mechanism 52). The induction point may be referred to as a singulation station, where individual units of items are associated with and placed into particular conveyance receptacles, which are then inducted into a conveyance mechanism. The conveyance mechanism, under direction of a control system, may then deliver the conveyance receptacles each including an individual unit of an item to various order processing stations 55, which may include one or more sorting stations, in the materials handling facility for processing prior to shipping 70. Portions of an order may be received from the pickers 42, or from other stations, at a processing station 55 at different times, so processing at a station may have to wait for one or more items for some orders to be delivered to the station from picking and/or from another station before completion of processing of the orders at the station.

The picked units of items delivered to a processing station via the conveyance receptacles on the conveyance mechanism may be processed at a processing station 55, for example sorted into their respective orders at a sorting station under direction of the control system. Once the processing of items for an order is completed at a station, the items may be delivered to another station for further processing, for example to a sorting station to be sorted into orders, or to a packing station to be packaged for shipping 70.

An order fulfillment center may also include one or more receiving 80 operations for receiving shipments 90 of stock from various vendors. The received stock may then be placed into stock storage. The receiving 80 operation may also receive and process returned, purchased, or rented items from customers. The various operations and stations of an order fulfillment center may be located in one building or facility, or alternatively may be spread or subdivided across two or more buildings or facilities.

Figure 3:
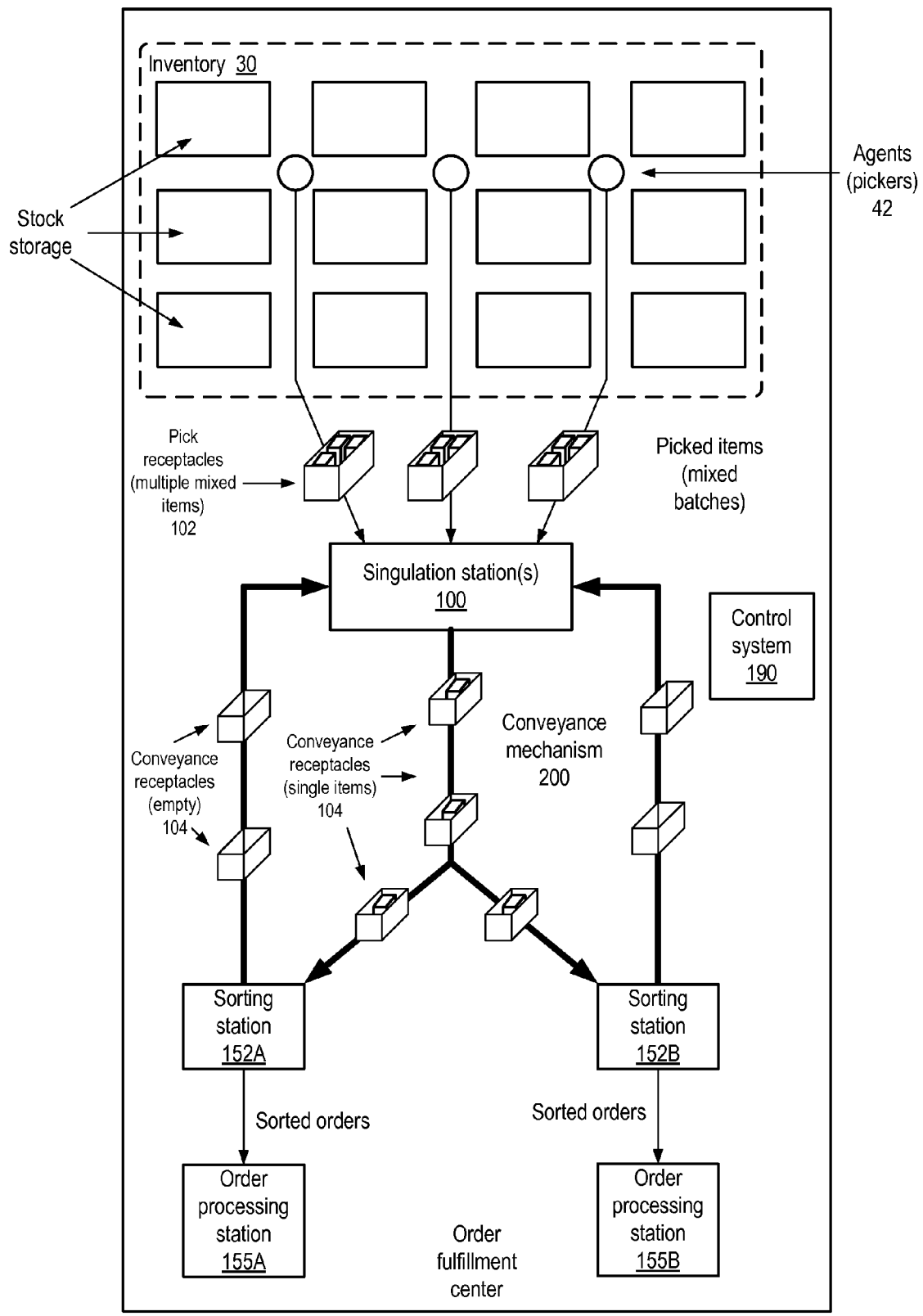
FIG. 3 illustrates an exemplary physical layout of a materials handling facility, such as an order fulfillment facility or center, in which an embodiment of the non-linear, unit-level sortation system is implemented.

FIG. 3 illustrates an exemplary physical layout of a materials handling facility, such as an order fulfillment facility or center, in which an embodiment of the non-linear, unit-level sortation system is implemented. Requests (e.g., orders) for items from requestors may be divided among multiple pickers 42, who then pick mixed batches of items from inventory storage 30. Picked units of items may be placed into pick receptacles 102 (e.g., totes or carts) for conveyance. The orders may be subdivided among the pickers 42; therefore, two or more of the pickers 42 may pick items for one order. Rather than delivering the picked batches of items directly to a linear automated sorting mechanism, where the individual items are inducted onto fixed carriers or trays on the automated sorting mechanism, the picked batches are delivered to a singulation station 100 or stations (there may be more than one singulation station 100), for example in pick receptacles 102 (e.g., totes) each containing one or more units of items, and each possibly containing items from two or more orders.

At the singulation station 100, each unit may be pulled individually from each picked batch (e.g., from a pick receptacle 102). Alternatively, all batches may be "dumped" into a common receptacle (a bin, basket, shelf, etc.), and individual units may then be pulled from the common receptacle. Each pulled unit is then placed into a conveyance receptacle 104 (e.g., a tote or tray), with one and only one unit placed into each conveyance receptacle 104. Receptacles, as used herein, may include, but are not limited to, any tote, basket, box, tray, or similar mechanism configured to receive individual units of items or batches of units of items in a materials handling facility. The conveyance receptacle 104 is not fixed to any conveyance mechanism. Again, only one unit of an item is placed into each conveyance receptacle 104.

The pulled unit of an item may be associated with the particular conveyance receptacle 104 it is placed in. In one embodiment, the association of a unit of an item with a particular conveyance receptacle 104 may be performed by reading, scanning or otherwise entering an item identifier associated with the item and a conveyance receptacle identifier associated with the particular conveyance receptacle 104 into which the unit is placed. The item identifier and receptacle identifier 106 may be communicated to a control system 190 of the materials handling facility via wired and/or wireless communications. Each conveyance receptacle 104 may include a unique conveyance receptacle identifier that uniquely identifies the particular conveyance receptacle 104 in the materials handling facility. The conveyance receptacle identifier may, for example, be indicated by a bar code, Radio Frequency Identifier (RFID) device, or some other scannable or readable mechanism, mark, or tag attached to or integrated with the conveyance receptacle 104.

Each unit of each item carried in inventory 30 may include an item identifier. A type of item held in inventory 30 may be referred to herein as simply an item. The term item identifier refers to a unique identifier associated with each particular type of item carried in inventory 30 of a distribution system. The term unit may be used to refer to one (unit) of a type of item. Typically, but not necessarily, each unit is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual items within a type of item.

Cases, boxes, bundles, or other collections of units of items may similarly be marked or tagged with item identifiers. The units of items in a collection may all be of the same type of item, for example a case of 12 units of a particular item, or may be a collection of one or more units of each of two or more heterogeneous items. A collection of units of item(s) (e.g., a case containing 12 units of an item, or a bundle containing one or more units of each of two or more heterogeneous items, such as a boxed or bundled set of three different books) may thus be considered or treated as a "unit" in the order fulfillment process. A designation, or code, may thus also identify a collection of units of item(s) as a "unit" in the order fulfillment process. Thus, embodiments of the non-linear, unit-level sortation system, in addition to sorting individual units of items, may also sort collections of units of item(s) designated as units. Therefore, the conveyance receptacles described herein may receive collections of units of item(s) that are designated as units as well as individual units of items.

Figure 10:
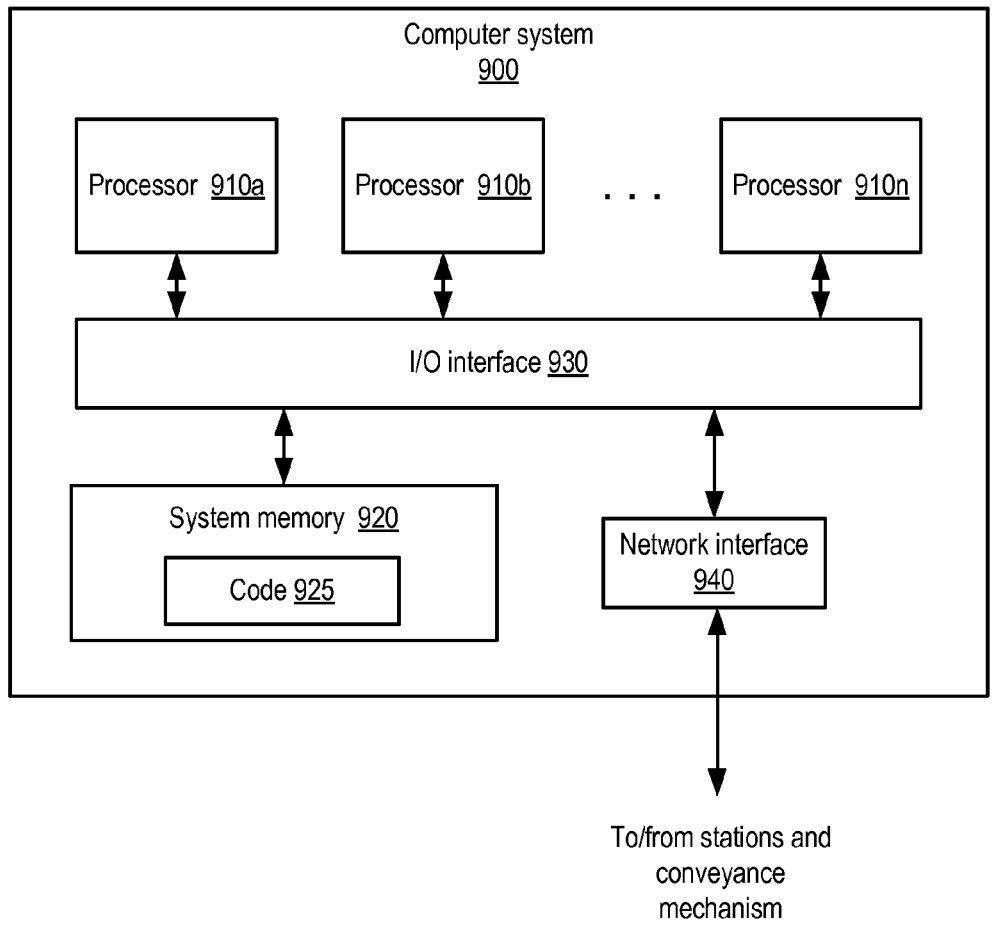
FIG. 10 is a block diagram illustrating an exemplary embodiment of a computer system.

A materials handling facility may include a control system 190 which may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, radio frequency identification (RFID) tags, etc.) on individual items (units) or collections of items (e.g., cases) and communicate with a control station or stations of the control system to, for example, determine and record the item and/or item type of the items. The hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles. An exemplary computer system that may be used in a control system 190 is illustrated in FIG. 10.

At the singulation station 100, a pulled unit of an item may be associated with a particular conveyance receptacle 104 by reading, scanning, etc. the item identifier associated with the item and the conveyance receptacle identifier associated with the conveyance receptacle 104 into the control system 190. This may be performed manually (e.g., by an operator using a hand-held scanner), via an automated scanning/reading process using fixed scanners/readers, or by a combination of manual and automatic scanning/reading. For example, an operator at the singulation station 100 may use a hand-held scanner to scan a code off the unit of the item before or during placement of the unit into a "staged" conveyance receptacle 104, while an automated reader may read (or may have already read) the conveyance receptacle identifier from the conveyance receptacle 104 that is "staged" for the operator to place the unit of the item into.

Once a pulled unit of an item is associated with and placed into a particular conveyance receptacle 104, the conveyance receptacle 104 may be inducted into a conveyance mechanism 200 (e.g., a conveyor belt, roller system, or other conveyance mechanism) to be conveyed thereby to one or more downstream processing stations for further processing of the unit of the item. In various embodiments, the conveyance mechanism 200 may be a conveyance sorter mechanism that includes some method of diverting product off a conveyance path under control of a control system. Examples of conveyance sorter mechanisms that may be used as conveyance mechanism 200 may include, but are not limited to, shoe sorter mechanisms and pop up sorter mechanisms, such as pop up wheel sorter mechanisms. A pop up wheel sorter includes powered wheels that rise up out of the conveyor to divert product off the conveyor onto a different path or to a location. Other types of conveyance sorter mechanism may be used in various embodiments.

The conveyance receptacle 104 may already be on the conveyance mechanism 200 when the unit is associated with and placed into the receptacle 104. Alternatively, a conveyance receptacle 104 may be retrieved from a conveyance receptacle storage, stack, or other supply, the unit may be associated with and placed into the receptacle 104, and the receptacle 104 may then be inducted into or placed on the conveyance mechanism 200. The conveyance receptacles 104 are not fixed to the conveyance mechanism 200; instead, the receptacles 104 are removable bins, trays, totes, or similar devices. The conveyance mechanism 200 may be coupled to and controlled by the materials handling facility control system 190 via wired and/or wireless communications. The control system 190 may receive input from and send commands to the conveyance mechanism 200 to direct or control various operations of the conveyance mechanism 200.

The above describes embodiments of a singulation station 100 in which a human operator performs at least a portion of the pulling of units of items from batches of picked items, scanning/reading the items and receptacles 104 to associate single units of items to particular conveyance receptacles 104, and placing the units into the conveyance receptacles 104. In alternative embodiments, some or all of the activities described as being performed by a human operator may be performed by automated mechanisms, which may be coupled to and under control of the materials handling facility control system 190.

Once the conveyance receptacles 104, each containing an individual unit of an item and each associated with the item it contains, are inducted into the conveyance mechanism 200, the receptacles 104 may be conveyed or routed to any of one or more processing stations, to one or more of various types of sorting mechanisms or processes, to other locations in the materials handling facility, and so on. In one embodiment, the conveyance mechanism may be directed by the control system 190 as to the routing of each particular conveyance receptacle 104. Since each conveyance receptacle 104 is associated with the particular item it contains, the control system 190 may, by tracking the conveyance receptacle 104 via its unique conveyance receptacle identifier, route the particular item to an appropriate destination.

The control system 190 may also include or have access to information on the orders in the order processing stream: for example, which orders are in the process of being fulfilled (i.e., which orders have been assigned to pickers), which orders have been picked, what items in what quantities are included on each order, and so on. By associating particular items associated with particular conveyance receptacles via the conveyance receptacle identifiers with the orders being processed, the control system 190 may route conveyance receptacles 104 containing units of items for particular orders to appropriate destinations for the orders, or for portions of the orders (e.g., to a particular one of one or more sorting stations 152 where particular orders are collected and grouped to be passed on to packing stations, or to other types of stations such as gift wrapping stations where pre-packing processing may be performed on orders or portions of orders, or even on individual units of items). The routing of conveyance receptacles 104 and the particular items contained therein may be performed automatically (e.g., by directing the conveyance mechanism 200 to deliver the conveyance receptacle 104 to a particular destination) and/or by providing indications to human operators as to the routing or placement of conveyance receptacles 104 and/or the items contained therein. As an example of the former, a reader communicatively coupled to the control system 190 may automatically read the conveyance receptacle identifier from a receptacle 104 as it passes on the conveyance mechanism 200, and the control system 190 may then direct the conveyance mechanism 200 to route the receptacle on a particular one of two or more paths or branches of the conveyance mechanism 200, for example to a branch that conveys the receptacle to a particular processing station. As an example of the latter, once a receptacle 104 is routed to and arrives at a processing station such as a sorting station 152, the conveyance receptacle identifier may be manually or automatically scanned or read from the receptacle 104, and the control system 190 may then activate an indicator on a particular slot, bin, shelf, etc. that is the correct destination for the item contained in the receptacle 104. The indicator may be a light, an audio signal, or some other mechanism or combination of mechanisms capable of conveying audio, visual, and/or other information to a human operator. Alternatively, the indicator may be textual or graphical directions displayed on a monitor of a computer, handheld device, etc., or printed to paper output.

Once the unit of an item has been pulled from its associated conveyance receptacle 104 at whatever destination the receptacle is routed to (e.g., a sorting station 152), the item and receptacle 104 may be disassociated by the control system 190. The empty (and unassociated) conveyance receptacle 104 may then be re-inducted, if necessary, into the conveyance mechanism 200 to be returned, e.g. to a singulation station 100 (there may be more than one singulation station 100; therefore, a receptacle 104 is not necessarily returned to the same singulation station 100 it came from). However, a conveyance receptacle 104 is not necessarily immediately re-inducted into the conveyance mechanism 200 when emptied. The conveyance receptacles 104 are not fixed or attached to the conveyance mechanism 200, and there is no necessary ordering of the receptacles 104 on the conveyance mechanism 200; therefore, an emptied conveyance receptacle 104 may be removed and set aside if necessary or desired. When an empty conveyance receptacle 104 arrives at a singulation station 100 by the return path of the conveyance mechanism 200, the conveyance receptacle 104 may be associated with and used to contain and convey a selected unit of an item from a mixed collection of items, or alternatively may be set aside into a conveyance receptacle storage area or stack if necessary or desired. Again, the conveyance receptacles 104 are not fixed to the conveyance mechanism 200, and are not ordered on the conveyance mechanism 200. The conveyance mechanism 200, in other words, is non-linear.

Figure 6:
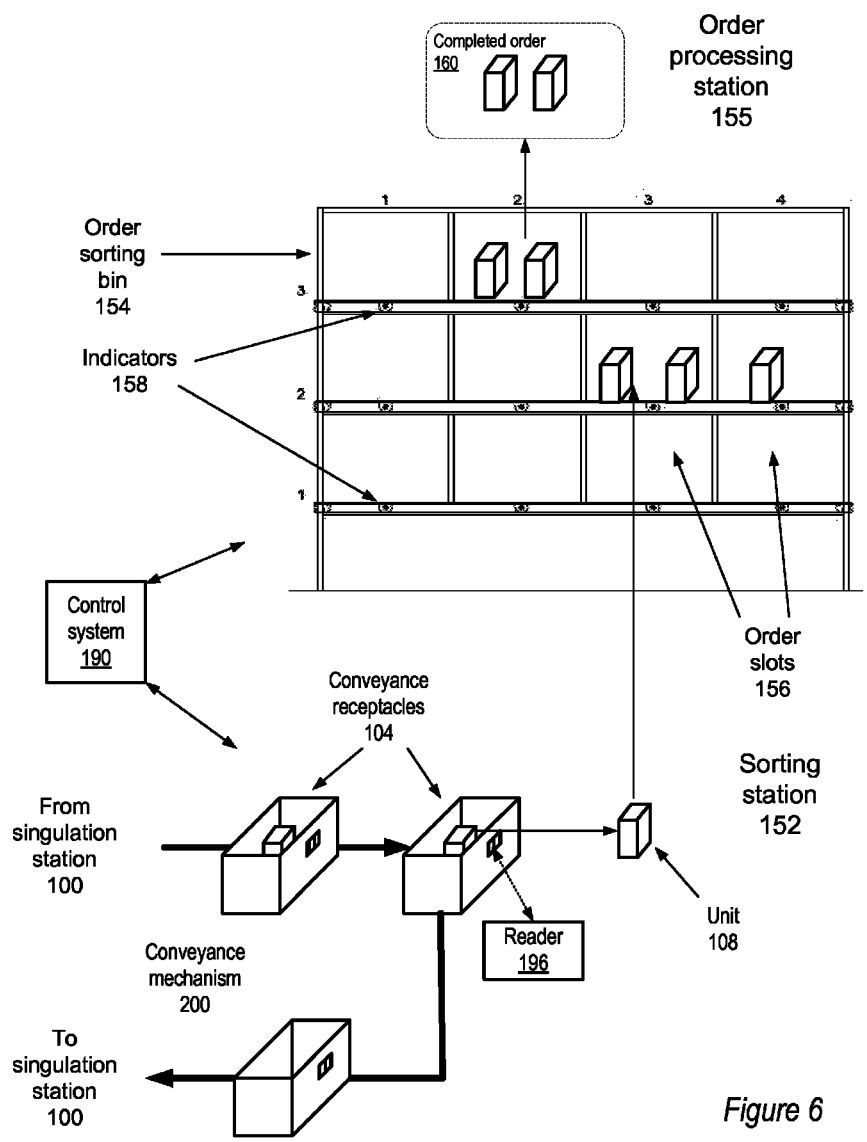
FIG. 6 illustrates operation of an exemplary sorting station that may be used in embodiments of the non-linear, unit-level sortation system.

The above describes a non-linear, unit-level sortation system for sorting mixed and unsorted collections of units of items to various destinations according to requests or orders for which the items were picked. A picking process delivers batches or a continuous stream of unsorted items for fulfilling requests to one or more singulation stations 100. At the singulation stations 100, individual units of items are pulled, associated with particular conveyance receptacles 104, and placed into the receptacles 104, with one and only one unit per receptacle 104. The conveyance receptacles 104 are inducted into a conveyance mechanism 200 under the direction of a control system 190 that, through various mechanisms, directs the receptacles 104, each containing and associated with a single unit of an item, to particular destinations. One such destination, in one embodiment, is a sorting station 152, where the individual items may be manually or automatically retrieved from conveyance receptacles 104 and manually or automatically placed into slots or bins corresponding to particular orders. Exemplary sorting stations 152 are illustrated in FIG. 6 and FIGS. 7A and 7B. Empty conveyance receptacles 104 may be returned from the destinations to the one or more singulation stations 100.

As noted above, the conveyance mechanism 200 is non-linear. The conveyance receptacles 104 are not fixed to the conveyance mechanism 200, and are not ordered on the conveyance mechanism 200. The conveyance mechanism 200 includes at least one conveyance path from the singulation station(s) 100 to one or more destinations to convey conveyance receptacles 104 each containing a single unit to the one or more destinations under direction of the control system 190. The conveyance mechanism 200 also includes at least one return path from at least one of the destinations to return empty conveyance receptacles to the singulation station(s) 100. Additional empty conveyance receptacles 104 may be inducted into the conveyance mechanism 200, for example to increase capacity of the non-linear, unit-level sortation system. Empty conveyance receptacles 104 may be removed from the conveyance mechanism 200, for example to reduce capacity of the non-linear, unit-level sortation system.

Thus, using the non-linear, unit-level sortation system as described herein, conveyance receptacles 104 may be added to or removed from the conveyance mechanism 200 as necessary or desired, for example to dynamically adjust to changes in throughput. This may allow embodiments to achieve greater velocity and total throughput than, for example, fixed, linear tilt-tray sorting mechanisms, which have a fixed number of carriers that go around in a fixed, non-flexible loop. Further, the conveyance receptacles 104 may handle a wider variety of sizes and types of items than for example a fixed, linear tilt-tray sorting mechanism, with no lower limit on the size of items that can be placed in a receptacle 104, and the upper limit being the volume/dimensions of the receptacles 104 themselves. Further, different sizes of receptacles 104 may be inducted into the conveyance mechanism 200 as necessary or desired. Larger receptacles 104 may be used if there are a large number of bigger items being processed in the materials handling facility. Smaller receptacles 104 may be used if the materials handling facility handles mostly small items, which would allow the total number of receptacles 104 on the conveyance mechanism 200 at one time to be increased. The maximum number of receptacles 104 that can be on the conveyance mechanism 200 at one time is limited by the size of the receptacles 104; therefore, the use of smaller receptacles may allow more receptacles 104 to be on the conveyance mechanism 200 at one time. Further, a mix of different sizes and configurations of receptacles 104 may be used on the conveyance mechanism 200 at one time, unlike linear, fixed-receptacle sorting mechanisms that typically have one fixed size and configuration of carrier (e.g., tilt tray), which is fixed to the sorting mechanism. Further, if the requirements of the materials handling facility change, for example if the materials handling facility increases or decreases the average size of items carried in inventory, the non-linear, unit-level sortation system may be adapted to handle the change simply, quickly and inexpensively by replacing some or all of the conveyance receptacles 104 and possibly making some other relatively inexpensive modifications, with little or no down time, rather than replacing or modifying entire linear, fixed-receptacle sorting mechanisms, which can be a very expensive and time-consuming process, which might require significant down time.

Figure 4:
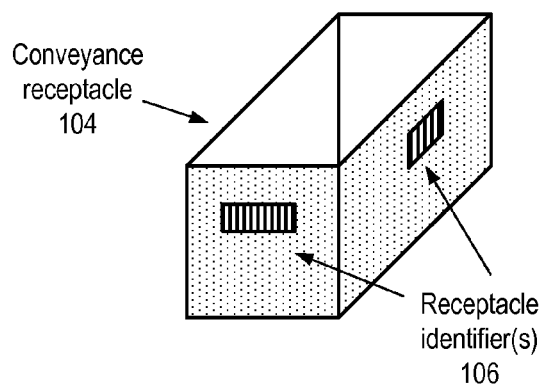
FIG. 4 illustrates an exemplary conveyance receptacle according to one embodiment.

FIG. 4 illustrates an exemplary conveyance receptacle according to one embodiment. Conveyance receptacle 104, may be, but is not limited to, a tote, basket, box, tray, or similar mechanism configured to receive individual units of items or batches of units of items in a materials handling facility. Conveyance receptacles 104 may come in a variety of sizes, volumes, and configurations. Conveyance receptacles 104 are not fixed to conveyance mechanism 200, and thus conveyance receptacles 104 can be added to or removed from conveyance mechanism 200. Only one unit of an item is placed into each conveyance receptacle 104.

Each conveyance receptacle 104 may be associated with a unique conveyance receptacle identifier 106 that uniquely identifies the particular conveyance receptacle 104 in the materials handling facility. The conveyance receptacle identifier 106 may, for example, be a bar code, Radio Frequency Identifier (RFID) device, or some other scannable or readable mark, tag, or device attached to or integrated with the conveyance receptacle 104. FIG. 4 illustrates conveyance receptacle 104 as including a receptacle identifier 106 attached to or integrated with the conveyance receptacle 104 at two locations. However, conveyance receptacles 104 may have one, two, or more receptacle identifiers 106 attached to or integrated with the receptacle. Receptacle identifiers 106 may be permanently fixed to conveyance receptacles 104 or, alternatively, may be attachable/removable.

A pulled unit of an item may be associated with a particular conveyance receptacle 104 it is placed in. In one embodiment, the association of a unit of an item with a particular conveyance receptacle 104 may be performed by reading, scanning or otherwise entering an item identifier associated with the item and a conveyance receptacle identifier 106 associated with the particular conveyance receptacle 104 into which the unit is placed. The item identifier and receptacle identifier 106 may be communicated to a control system 190 of the materials handling facility via wired and/or wireless communications.

Figure 5:
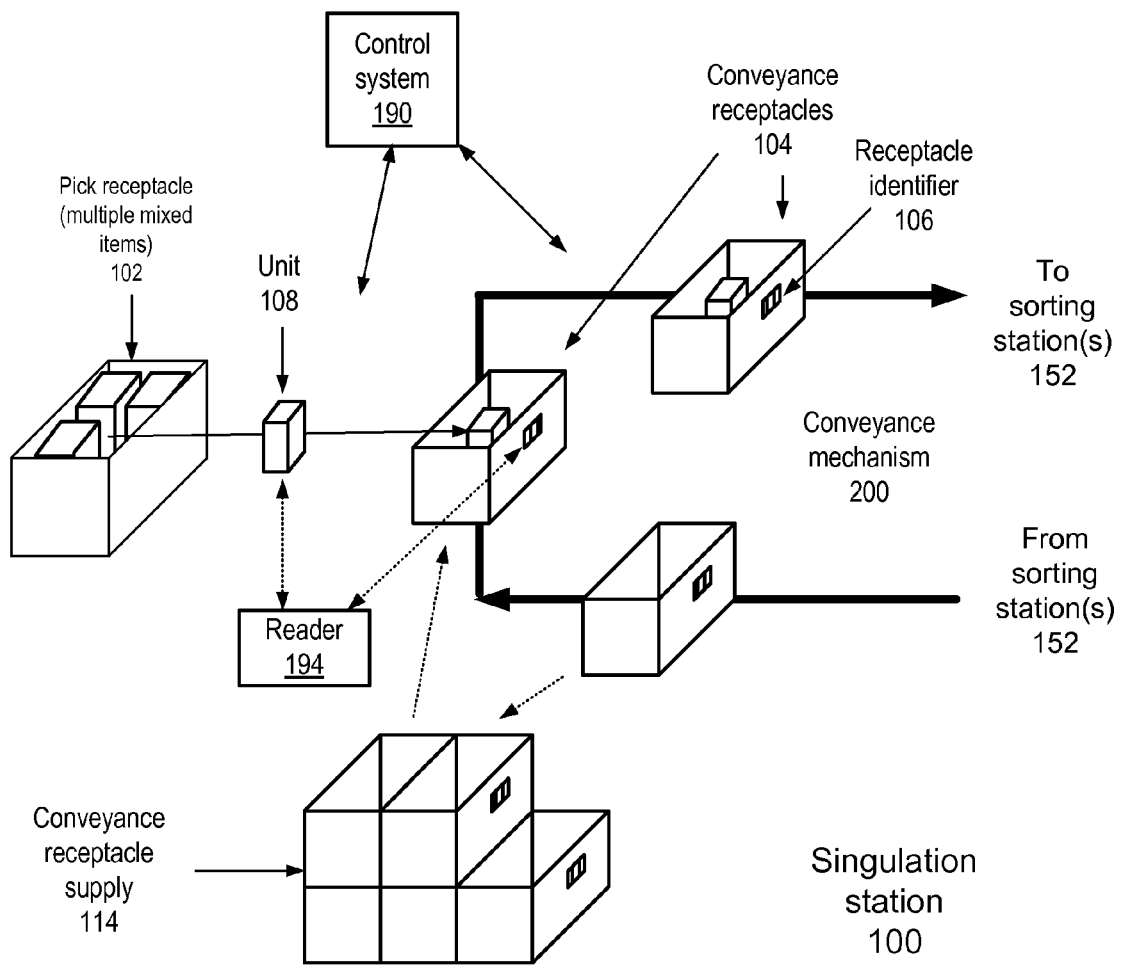
FIG. 5 illustrates operation of an exemplary singulation station according to one embodiment.

FIG. 5 illustrates operation of an exemplary singulation station according to one embodiment. Requests (e.g., orders) for items from requestors may be divided among multiple pickers, who then pick mixed batches or collections of items from inventory storage. One or more picked units 108 of one or more items may be placed into pick receptacles 102 (e.g., totes or carts) for conveyance. The picked batches or collections of mixed items may be delivered or conveyed to singulation station 100, for example in pick receptacles 102 each containing one or more units of one or more items, and each possibly containing items from two or more orders. Thus, each pick receptacle may contain an assortment of various items picked for one or more orders.

Empty conveyance receptacles 104 may be returned to singulation station 100 from one or more locations in the materials handling facility (e.g., from one or more sorting stations 152) on conveyance mechanism 200. A supply 114 of conveyance receptacles 104 may be kept at or near singulation station 100. Arriving receptacles 104 may remain on conveyance mechanism 200 to be used to receive, contain and convey units 108 of items or, alternatively, may be removed and placed into supply 114.

A unit 108 of an item may be pulled from a pick receptacle 102, for example by a human operator, at singulation station 100. Alternatively, all batches may be "dumped" into a common receptacle (a bin, basket, shelf, etc.), and individual units 108 may then be pulled from the common receptacle. Other methods of inducting items into singulation station 100 are possible; for example, pulled units of items may be conveyed to singulation station 100 on a conveyer belt or roller system. The pulled unit 108 may be associated with a particular conveyance receptacle 104 and placed into the receptacle 104. One and only one unit 108 is associated with and placed into each conveyance receptacle 104.

In one embodiment, the association of a unit of an item with a particular conveyance receptacle 104 may be performed by reading, scanning or otherwise entering an item identifier associated with the item and a unique conveyance receptacle identifier 106 associated with the particular conveyance receptacle 104 into which the unit 108 is placed. In one embodiment, a fixed, mobile, or hand-held reader 194 may be used to read or scan the item identifier and receptacle identifier 106. Associating a pulled unit 108 of an item with a particular conveyance receptacle 104 may be performed manually (e.g., by an operator using a hand-held scanner), via an automated scanning/reading process using fixed scanners/readers, or by a combination of manual and automatic scanning/reading. For example, an operator at the singulation station 100 may use a hand-held scanner to scan a code off the unit of the item before or during placement of the unit into a "staged" conveyance receptacle 104, while an automated reader may read (or may have already read) the conveyance receptacle identifier from the conveyance receptacle 104 that is "staged" for the operator to place the unit of the item into. The read or scanned item identifier and receptacle identifier 106 may be communicated to a control system 190 of the materials handling facility via wired and/or wireless communications.

Once a pulled unit 108 of an item is associated with and placed into a particular conveyance receptacle 104, the conveyance receptacle 104 may be inducted into conveyance mechanism 200 (e.g., a conveyor belt, roller system, or other conveyance mechanism) to be conveyed thereby to one or more downstream processing stations for further processing of the unit of the item. In FIG. 5, conveyance mechanism 200 is shown as conveying receptacles 104 containing units of items to one or more sorting stations 152, and returning empty receptacles 104 from the sorting station(s) 152. Exemplary sorting stations 152 to which conveyance receptacles 104 may be delivered by conveyance mechanism 200 are illustrated in FIG. 6 and FIGS. 7A and 7B. In various embodiments, the conveyance mechanism 200 may be a conveyance sorter mechanism that includes some method of diverting product off a conveyance path under control of a control system. Examples of conveyance sorter mechanisms that may be used as conveyance mechanism 200 may include, but are not limited to, shoe sorter mechanisms and pop up sorter mechanisms, such as pop up wheel sorter mechanisms. Other embodiments may use other mechanisms as a conveyance mechanism 200.

The conveyance receptacle 104 may already be on the conveyance mechanism 200 when the unit 108 is associated with and placed into the receptacle 104. Alternatively, a conveyance receptacle 104 may be retrieved from a conveyance receptacle 104 storage, stack, or other supply 114, a unit 108 may be associated with and placed into the receptacle 104, and the receptacle 104 may then be inducted into or placed on the conveyance mechanism 200. Once the conveyance receptacles 104, each containing an individual unit 108 of an item and each associated with the item it contains, are inducted into conveyance mechanism 200 at singulation station 100, the receptacles 104 may be conveyed to any of one or more processing stations, to one or more of various types of sorting mechanisms, to other locations in the materials handling facility, and so on. For example, conveyance receptacles 104 may be conveyed to a sorting station 152.

The conveyance mechanism 200 may be coupled to and controlled by the materials handling facility control system 190 via wired and/or wireless communications. The control system 190 may receive input from and send commands to the conveyance mechanism 200 to direct or control various operations of the conveyance mechanism 200. The control system 190 may, for example, control conveyance mechanism 200 to direct a particular conveyance receptacle 104 and its associated unit 102 to a particular sorting station 152, as illustrated in FIG. 5.

In one embodiment, a human operator may perform at least a portion of the pulling of units 108 of items from batches of picked items, scanning/reading the items and receptacles 104 to associate single units 108 of items to particular conveyance receptacles 104, and placing the units into the conveyance receptacles 104 at singulation station 100. In alternative embodiments, some or all of the activities described as being performed by a human operator may be performed by automated mechanisms, which may be coupled to and under control of the materials handling facility control system 190.

FIG. 6 illustrates operation of an exemplary sorting station that may be used in embodiments of the non-linear, unit-level sortation system. Once the conveyance receptacles 104, each containing an individual unit 108 of an item and each associated with the item it contains, are inducted into the conveyance mechanism 200, at least some of the receptacles 104 may be conveyed to sorting station 152. In one embodiment, the conveyance mechanism may be directed by the control system 190 as to the disposition of each particular conveyance receptacle 104. Since each conveyance receptacle 104 is associated with the particular item it contains, the control system 190 may, by tracking a particular conveyance receptacle 104 via its unique conveyance receptacle identifier 106, direct the conveyance mechanism to route the particular conveyance receptacle 104 and its associated unit 108 of the item to sorting station 152 from an originating singulation station 100.

To route a particular conveyance receptacle 104 and its associated unit 108 of an item to a particular destination, the control system 190 may also include or have access to information on the orders in the order processing stream: which orders are in the process of being fulfilled (i.e., which orders have been assigned to pickers), which orders have been picked, what items in what quantities are included on each order, and so on. The control system may associate a particular conveyance receptacle 104 including a unit 108 of a particular item with a particular order currently being processed in the order fulfillment process, and may route the conveyance receptacle 104 to an appropriate destination for the order (e.g., to sorting station 152 of FIG. 6). The routing of conveyance receptacles 104 may be performed automatically (e.g., by control system 190 directing the conveyance mechanism 200 to deliver a conveyance receptacle 104 to a particular destination). As an example, a reader communicatively coupled to the control system 190 may automatically read the conveyance receptacle identifier from a receptacle 104 as it passes on the conveyance mechanism 200, and the control system 190 may then direct the conveyance mechanism 200 to route the receptacle on a particular one of two or more paths or branches of the conveyance mechanism 200, for example to a path that conveys the receptacle to sorting station 152.

Control system 190 may also provide audible, visual, or other indications to human operators as to the routing or placement of conveyance receptacles 104 and/or the units 108 of items contained therein. For example, once a particular conveyance receptacle 104 arrives at sorting station 152, the conveyance receptacle identifier 106 may be manually or automatically scanned or read from the receptacle 104 and communicated to control system 190. In one embodiment, a fixed, mobile, or hand-held reader 196 may be used to read or scan the conveyance receptacle identifier 106. After the conveyance receptacle identifier 106 is read, the control system 190 may activate an indicator 158 associated with a particular order slot 156 of an order sorting bin 154 located at the sorting station 152 that assigned to an order that is associated with receptacle 104 and thus with the unit 108 of an item contained therein. The indicator 158 may be a light, an audio signal, or some other mechanism or combination of mechanisms capable of conveying audible, visual, and/or other information to a human operator. As an alternative, or in addition, to indicators 158 physically located proximate to slots 156 on sorting bin 154, textual and/or graphical item placement directions may be displayed on a monitor of a computer, hand-held device, etc., or printed to paper output for operator(s) at sorting station 152.

There may be one or more order processing stations 155 associated with sorting station 152. In this example, an order processing station 155 is located on the other side of order sorting bin 154. Order processing station 155 may, for example, be a packing station at which one or more units 108 of items for an order are processed, packed, and labeled for shipping to the customer. The order slots 156 may be pass-through slots into one side of which units 108 of items may be placed, and out of which individual or collections of units 108 of items may be removed for processing. In one embodiment, units 108 of items may be removed from conveyance receptacles 104 and placed into a particular slot (e.g., item 108 is illustrated as being placed into slot (3, 2)) as indicated by the control system 190, for example by the control system 190 activating an indicator 158 associated with the slot 156 into which the unit 108 is to be placed to indicate to the operator that the unit 108 from the current receptacle 104 is to be placed into that slot 156. Sorting bin 154 may also include indicators associated with the slots 156 on the order processing station 155 side which control system 190 may activate to indicate to operators at the order processing station 155 that a particular slot 156 is ready to be processed (e.g., that all units 108 of all items for an order have been placed into that slot). In this example, control system has indicated to operator(s) at order processing station 155 that an order 160 in slot (2, 1) has been completed. An operator may then pull the order 160 from the slot 156 for further processing.

A sorting process using a singulation station 100, conveyance receptacles 104 each including one unit 108 of an item, and a conveyance mechanism 200, under direction of control system 190, may free operators at sorting stations 152 from having to scan each individual item during sorting. In one embodiment, the conveyance receptacle identifier 106 may be automatically read by a reader 196 as the receptacle 104 approaches or enters the location of sorting station 152 at which the operator removes units 108 from receptacles. The operator may thus simply remove the unit 108, look to see which indicator 156 is currently activated by control system 190, and place the unit 108 into the associated slot 154.

Once the unit 108 of an item has been pulled from its associated conveyance receptacle 104 at sorting station 152, the item and receptacle 104 may be disassociated in the control system 190. The control system 190 may determine via the processing at sorting station 152, or alternatively may be informed via operator interaction with the control system 190, that the conveyance receptacle 104 is now empty. The empty (and unassociated) conveyance receptacle 104 may then be re-inducted, if necessary or desired, into the conveyance mechanism 200 to be returned, for example, to a singulation station 100. There may be more than one singulation station 100 in a materials handling facility; therefore, a receptacle 104 is not necessarily returned to the same singulation station 100 that it originated from. A conveyance receptacle 104 is not necessarily immediately re-inducted into the conveyance mechanism 200 when emptied. The conveyance receptacles 104 are not fixed or attached to the conveyance mechanism 200, and there is no necessary ordering of the receptacles 104 on the conveyance mechanism 200; therefore, an emptied conveyance receptacle 104 may be removed and set aside if necessary or desired.

FIGS. 7A and 7B illustrate a side view and a top view, respectively, of an exemplary sorting station and associated order processing stations according to one embodiment. In this example, a sorting station 152 includes two order sorting bins 154A and 154B. Order processing station 155A is located on the other side of order sorting bin 154A, and order processing station 155B is located on the other side of order sorting bin 154B. Conveyance mechanism 200 may induct a particular conveyance receptacle 104 to the sorting station 152 as the current or active receptacle 104A. In one embodiment, a reader 196 (see FIG. 7B) may read the receptacle identifier 106 from the receptacle 104A as or prior to the induction of the receptacle 104A to the sorting station 152 as the active receptacle 104A. Control system 190 may then activate an indicator 158 on a particular order slot 156 of one or the other of the order sorting bins 154 to indicate to the operator that the unit of the item in the active receptacle 104A is to be placed into the associated order slot 156. After the item is pulled from the active receptacle 104A and placed in the slot 156, the indicator may deactivate, and the control system 190 may disassociate the item from the active receptacle 104A to indicate the receptacle 104A is empty. The active receptacle 104A may then be conveyed onto a return path of the conveyance mechanism 200, and the next conveyance receptacle 104B on the conveyance mechanism 200 may be inducted as the active receptacle.

Sorting bins 154 may also include indicators associated with the slots 156 on the order processing station 155 side which control system 190 may activate to indicate to operators at the order processing stations 155 that a particular slot 156 is ready to be processed (e.g., that all units 108 of all items for an order have been placed into that slot). Once control system has indicated to operator(s) at order processing stations 155 that an order in a slot 156 has been completed, an operator may then pull the order from the slot 156 for further processing. In embodiments, sorting bins 154 may have different configurations. For example, sorting bins 154A and 154B are illustrated with different size slots 156 in FIG. 7B.

In one embodiment, one or more other receptacles (e.g., transfer tote 162) may be located at or near sorting station 152. Control system 190, after reading the receptacle identifier 106 of active receptacle 104, may activate an indication (e.g., a light) that indicates to the operator that the item in the active receptacle 104 is to be placed into, e.g., the transfer tote 162. When the transfer tote 162 is full, the operator may then convey, or induct the transfer tote 162 into another conveyance mechanism, to deliver the transfer tote 162 to another processing station or destination in the materials handling facility. Transfer totes 162 may be marked with transfer tote identifiers similar to the conveyance receptacle identifiers, and thus may be tracked by control system 190. After a transfer tote 162 is conveyed from the sorting station 152, a new transfer tote 162 may be placed at the sorting station 152.

Processed (e.g., packed) orders and/or other receptacles such as transfer totes 162 may be conveyed from order processing stations 155 and/or sorting station 152 via processed order/transfer tote conveyance 210, as illustrated in FIG. 7B. Processed order/transfer tote conveyance 210 may, for example, be a conveyor belt mechanism, roller system, manual or motorized carts, or some other mechanism.

FIG. 6 and FIGS. 7A and 7B illustrate and describe embodiments of a sorting station 152 in which a human operator performs at least a portion of the pulling of units 108 from conveyance receptacles 108 and placing the units into slots 156 of an order sorting bin 156. In alternative embodiments, some or all of the activities described as being performed by a human operator at a sorting station 152 may be performed by one or more automated mechanisms, which may be coupled to and under direction and control of the materials handling facility control system 190.

Figure 8A:
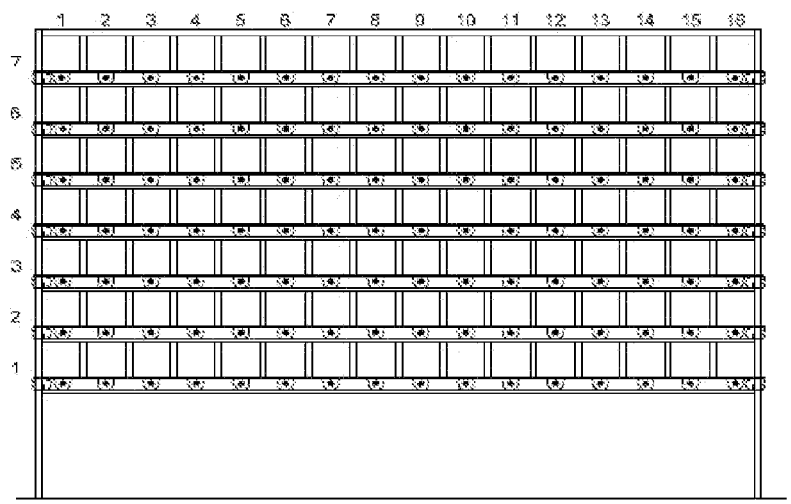
FIGS. 8A through 8E illustrate exemplary configurations for order sorting bins which may be used in various embodiments.
Figure 8B:
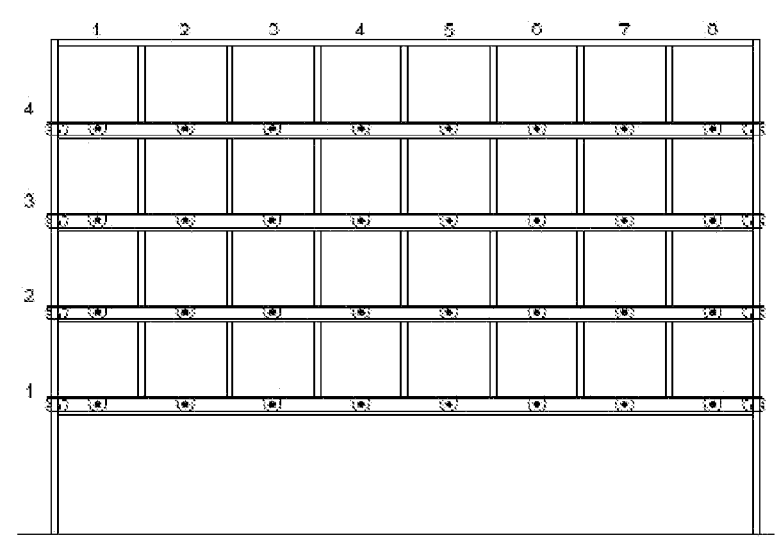
Figure 8C:
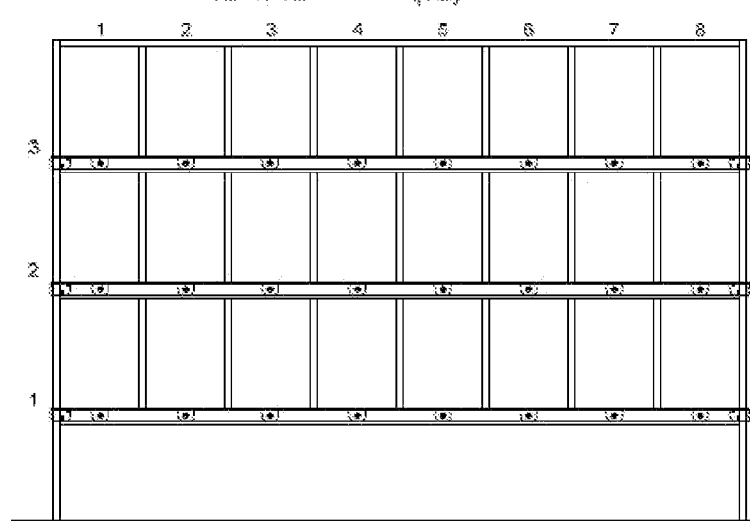
Figure 8D:
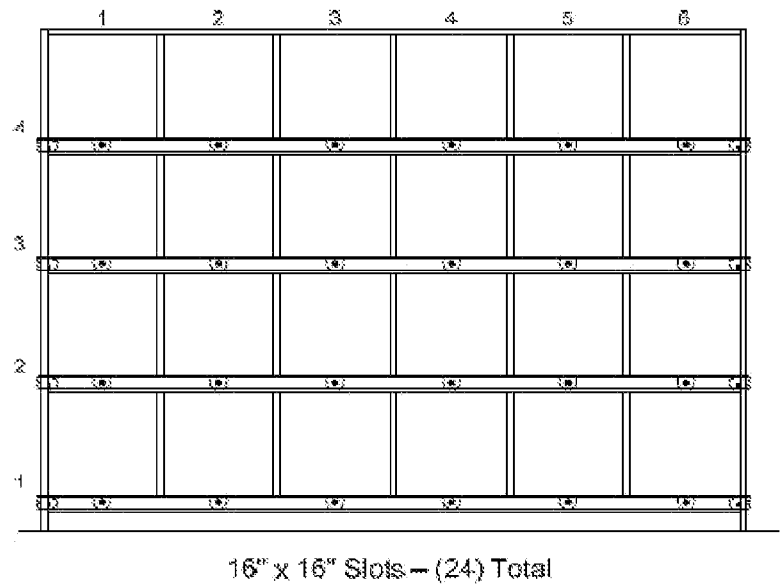
Figure 8E:
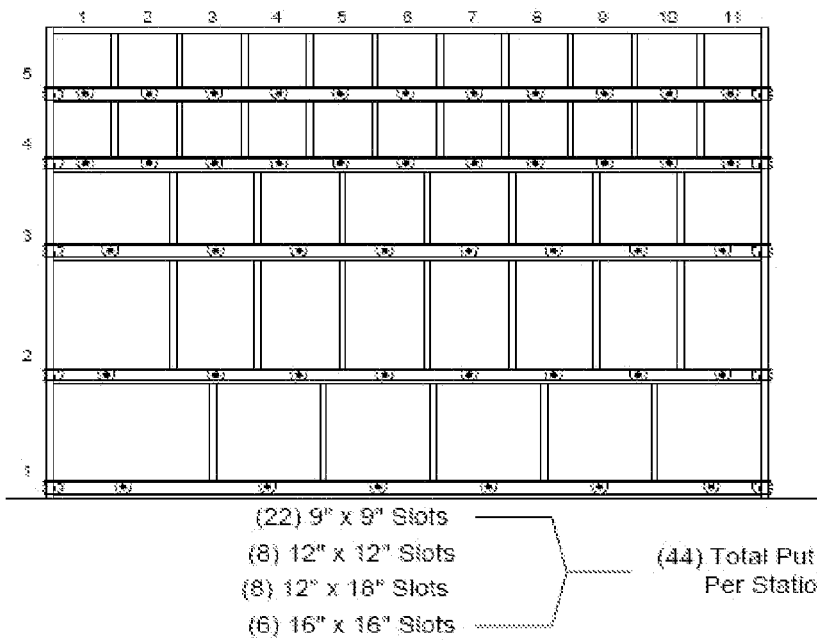

FIGS. 8A through 8E illustrate exemplary configurations for order sorting bins that may be used in various embodiments. In various embodiments, sorting bins 154 may have different configurations, and sorting bins with different configurations may be used together in an implementation of the non-linear, unit-level sortation mechanism that uses sorting stations 152 similar to those illustrated in FIG. 6 and FIGS. 7A and 7B. Sorting bins may have different size slots to accommodate larger or smaller orders and/or larger or smaller items. FIG. 8A illustrates an order sorting bin with 112 6"×6" slots. FIG. 8B illustrates an order sorting bin with 32 12"×12" slots. FIG. 8C illustrates an order sorting bin with 24 12"×18" slots. FIG. 8D illustrates an order sorting bin with 24 16"×16" slots. FIG. 8E illustrates an exemplary hybrid order sorting bin that includes six 16"×16" slots, eight 12"×18" slots, eight 12"×12" slots, and 22 9"×9" slots.

Figure 9:
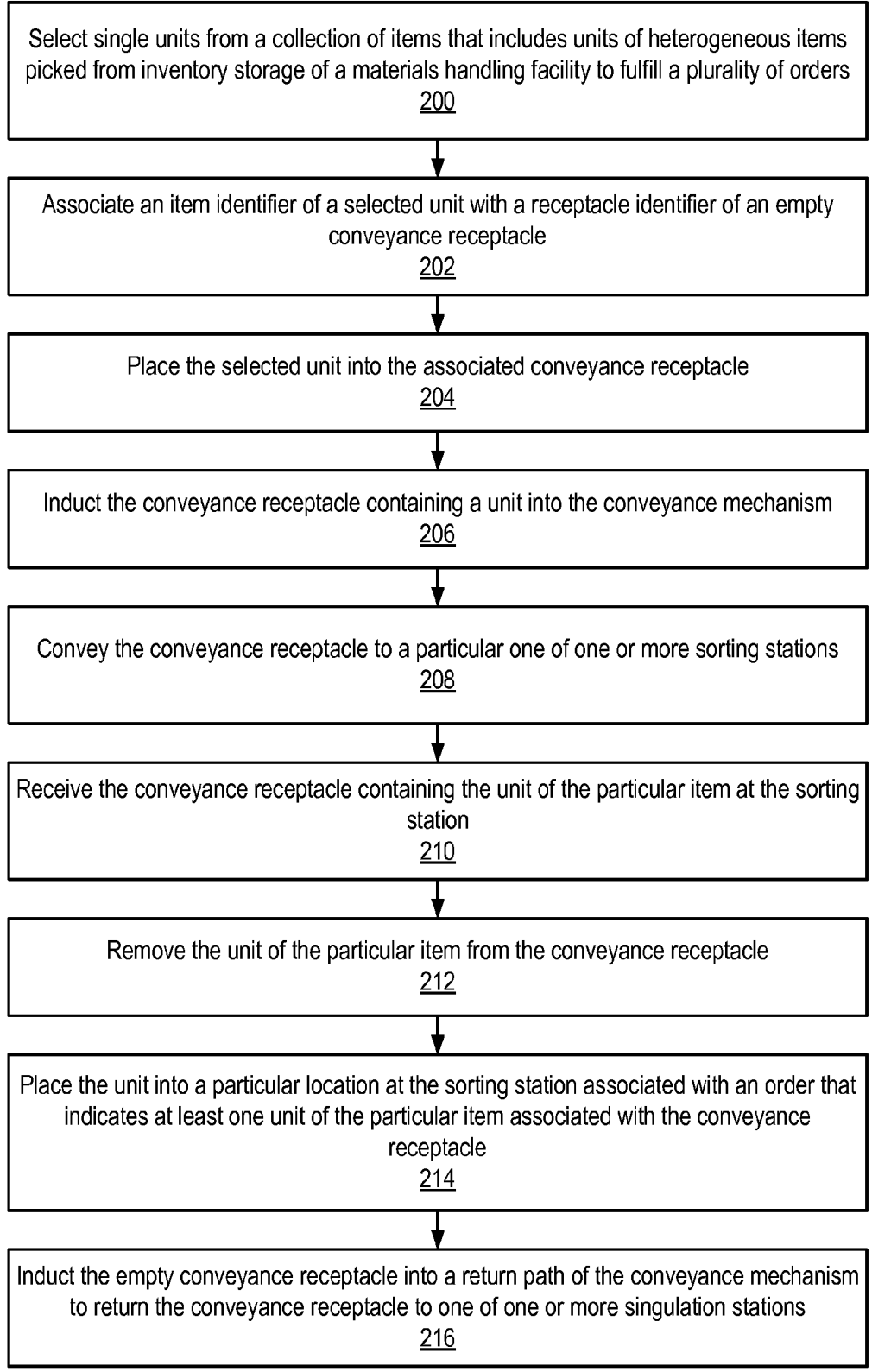
FIG. 9 is a flowchart illustrating a method of operation in a non-linear, unit-level sortation system according to one embodiment.

FIG. 9 is a flowchart illustrating a method of operation in a non-linear, unit-level sortation system according to one embodiment. This flowchart illustrates how the various components described herein, e.g. one or more singulation stations, a plurality of free-floating conveyance receptacles each identified by a unique receptacle identifier, a conveyance mechanism, one or more sorting stations, and a control system, may be integrated to form a non-linear, unit-level sortation system for handling the sortation of mixed batches or streams of items picked to fulfill orders the materials handling facility. The method as illustrated in FIG. 9 may be performed as a continuous or near-continuous process by the non-linear, unit-level sortation system in the materials handling facility to sort a continuous or near-continuous incoming stream of mixed items picked to fulfill orders into their respective orders.

Elements 200 through 206 may be performed at a singulation station, such as singulation station 100 illustrated in FIGS. 3 and 5. Element 208 may be performed by a conveyance mechanism, such as conveyance mechanism 200 illustrated in FIGS. 3, 5, 6, 7A and 7B, which may be controlled by a control system 190 as illustrated in those Figures. An exemplary computer system that may implement software components and functionality of control system 190 is illustrated in FIG. 10. Elements 210 through 216 may be performed at a sorting station, such as sorting station 152 illustrated in FIGS. 3, 6, 7A and 7B.

A pick process in the materials handling facility may generate batches or a stream of picked units of heterogeneous items that are mixed together in one or more collections (e.g., in pick receptacles). The collections of items may be delivered to one of one or more singulation stations in the materials handling facility. As indicated at 200, at a singulation station, single units may be selected from the collection of items that includes units of heterogeneous items picked from the inventory storage of the materials handling facility to fulfill a plurality of orders. The selection of single units from the collection may be performed manually or automatically in various embodiments. As indicated at 202, an item identifier of a selected unit may be associated with a receptacle identifier of an empty conveyance receptacle. To associate the item identifier with the conveyance receptacle, the item identifier may be manually or automatically read from the selected unit, e.g. by a fixed or hand-held scanner or reader, and the receptacle identifier may be manually or automatically read from the conveyance receptacle into which the selected unit is to be placed, e.g. by a fixed or hand-held scanner or reader. In one embodiment, the receptacle identifier may be indicated by a bar code attached to or integrated with the conveyance receptacle, and to read the receptacle identifier from the conveyance receptacle, the bar code may be electronically scanned from the conveyance receptacle, e.g. by a fixed or hand-held scanner. In one embodiment, the receptacle identifier may be indicated by a Radio Frequency Identifier (RFID) tag attached to or integrated with the conveyance receptacle, and, to read the receptacle identifier from the conveyance receptacle, the RFID tag may be read from the conveyance receptacle, e.g. by a fixed or hand-held RFID reader. The item identifier and receptacle identifier may be communicated to a control system, at which the two identifiers may be associated. The control system may also include information on orders currently being processed, and thus may associate the conveyance receptacle and the item contained in the conveyance receptacle with a particular order that indicates at least one unit of the item.

As indicated at 204, the selected unit may be placed into the associated conveyance receptacle and, as indicated at 206, the conveyance receptacle containing the selected unit may be inducted into the conveyance mechanism to be conveyed thereby to a destination in the materials handling facility, such as a sorting station. The empty conveyance receptacle may have been retrieved from a receptacle supply at or near the singulation station prior to induction, or alternatively may have already been on the conveyance mechanism, e.g. the conveyance receptacle may be an empty receptacle returned via the conveyance mechanism from a sorting station. The conveyance receptacles are not fixed to the conveyance mechanism, and therefore can be placed on or removed from the conveyance mechanism as necessary or desired.

As indicated at 208, the conveyance mechanism may convey the conveyance receptacle to a particular one of one or more sorting stations in the materials handling facility that is the destination for an order that specifies at least one unit of the item contained in and associated with the conveyance receptacle. A control system may direct the conveyance mechanism to route the conveyance receptacle to the correct destination, e.g. a sorting station at which an order specifying at least one unit of the item contained in the conveyance receptacle is to be collected for processing.

As indicated at 210, the conveyance receptacle containing the unit of the particular item may be received at the sorting station. At the sorting station, the unit of the particular item may be manually or automatically removed from the conveyance receptacle, as indicated at 212. The unit may then be manually or automatically placed into a particular location at the sorting station associated with an order that indicates at least one unit of the particular item associated with the conveyance receptacle, as indicated at 214. In one embodiment, the particular location may be a particular slot of an order sorting bin, such as one of the exemplary order sorting bins 154 illustrated in FIGS. 6 through 8E.

In one embodiment, to place the unit into a particular location at the sorting station, the receptacle identifier may be manually or automatically read from the conveyance receptacle at or near the sorting station, and an indicator associated with the particular location may be automatically activated in response to reading the receptacle identifier to indicate to an operator that the unit of the particular item associated with the conveyance receptacle is to be placed into that particular location.

As indicated at 216, the empty conveyance receptacle may be, but is not necessarily inducted into a return path of the conveyance mechanism to return the conveyance receptacle to one of one or more singulation stations. The control system may direct the conveyance mechanism to return the empty conveyance receptacle to a particular one of one or more singulation stations, or alternatively may direct the conveyance system to route the empty conveyance receptacle to some other destination. At a singulation station, the returned empty conveyance receptacle may be associated with another item, receive a unit of the item selected from a collection, and then be conveyed by the conveyance mechanism back to the singulation station or to another destination under direction of the control system. Alternatively, empty conveyance receptacles may be removed from the conveyance mechanism at the sorting station(s), singulation station(s), or at other locations along or destinations of the conveyance mechanism.

Illustrative System

In one embodiment, a system that implements one or more components of a non-linear, unit-level sortation system as described herein may include a general-purpose computer system that includes or is configured to access one or more computer-accessible media, such as computer system 900 illustrated in FIG. 10. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system 190 in a non-linear, unit-level sortation system, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems, communications devices, control mechanisms, readers, scanners and so on that are components of the non-linear, unit-level sortation system. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 9 for implementing a control system for, or possibly other components of, a non-linear, unit-level sortation system. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a conveyance mechanism;
a plurality of conveyance receptacles; and
a singulation station, operable to:
receive a pick receptacle that includes units of heterogeneous items picked from inventory storage of the materials handling facility to fulfill a plurality of customer orders,
associate individual units of inventory items, selected from the received units of heterogeneous items, to respective ones of the plurality of conveyance receptacles, and
induct one or more conveyance receptacles, respectively containing an associated individual unit of inventory item into the conveyance mechanism.

2. The system as recited in claim 1, further comprising a sorting station, wherein the conveyance mechanism is operable to convey the conveyance receptacles containing single units of items from the singulation station to the sorting station.

3. The system as recited in claim 2, wherein the sorting station is operable to:
receive a conveyance receptacle containing an associated individual unit of a particular inventory item;
extract the associated individual unit of the particular inventory item from the received conveyance receptacle; and
convey the extracted unit of the particular inventory item to a particular location at the sorting station associated with a customer order indicating a purchase that includes at least one unit of the particular inventory item.

4. The system as recited in claim 3, wherein the sorting station is operable to induct empty conveyance receptacles into a return path of the conveyance mechanism, wherein the return path of the conveyance mechanism is configured to return the empty conveyance receptacles to the singulation station.

5. The system as recited in claim 4, wherein the singulation station is operable to remove a returned empty conveyance receptacle from the conveyance mechanism.

6. The system as recited in claim 4, wherein the singulation station is operable to:
associate an item identifier of a selected unit with a receptacle identifier of a returned empty conveyance receptacle; and
induct the returned conveyance receptacle containing the selected unit into the conveyance mechanism without removing the returned conveyance receptacle from the conveyance mechanism.

7. The system as recited in claim 3, further comprising a control system configured to disassociate the particular inventory item from the conveyance receptacle after the unit of the particular inventory item is removed from the conveyance receptacle.

8. The system as recited in claim 3, wherein the sorting station includes one or more order sorting bins each comprising a plurality of order slots, and wherein the particular location is a particular one of the plurality of order slots in one of the one or more order sorting bins.

9. The system as recited in claim 3, further comprising a control system configured to:
read the receptacle identifier from the conveyance receptacle at the sorting station; and
activate an indicator associated with the particular location to indicate to an operator that the unit of the particular inventory item associated with the conveyance receptacle is to be conveyed to that particular location.

10. The system as recited in claim 3, further comprising a control system configured to:
determine whether the customer order associated with the particular location is complete; and
in response to determining that the customer order is complete, activate an indicator associated with the particular location to indicate to an operator that the customer order associated with the particular location is complete and ready to be processed.

11. The system as recited in claim 1, wherein, to associate individual units of inventory items to respective ones of the plurality of conveyance receptacles, the singulation station is operable to:
read an item identifier from a selected unit;
read a receptacle identifier from a conveyance receptacle to which the selected unit is to be associated; and communicate the item identifier and the receptacle identifier to a control system.

12. The system as recited in claim 11, wherein the receptacle identifier is indicated by a bar code attached to or integrated with the conveyance receptacle, and wherein, to read a receptacle identifier from a conveyance receptacle, the singulation station is operable to electronically scan the bar code from the conveyance receptacle.

13. The system as recited in claim 11, wherein the receptacle identifier is indicated by a Radio Frequency Identifier (RFID) tag attached to or integrated with the conveyance receptacle, and wherein, to read a receptacle identifier from a conveyance receptacle, the singulation station is operable to electronically read the RFID tag from the conveyance receptacle.

14. The system as recited in claim 1, further comprising two or more sorting stations and a control system, wherein the control system is configured to direct the conveyance mechanism to convey inducted conveyance receptacles containing single units of items from the singulation station to particular ones of the sorting stations.

15. The system as recited in claim 1, further comprising two or more singulation stations, wherein each singulation station is operable to:
   receive a pick receptacle that includes units of heterogeneous items picked from the inventory storage of the materials handling facility to fulfill customer orders;
   associate respective individual units of inventory items, selected from the received units of heterogeneous items, to a respective empty conveyance receptacle;
   induct one or more conveyance receptacle, respectively containing an associated individual unit of inventory item into the conveyance mechanism.

16. The system as recited in claim 1, wherein the conveyance mechanism comprises a conveyance path from the singulation station to one or more destinations to convey the one or more conveyance receptacles, respectively containing an associated individual single unit, to the one or more destinations, and wherein the conveyance mechanism further comprises at least one return path from at least one of the destinations to return empty conveyance receptacles to the singulation station.

17. The system as recited in claim 15, wherein the conveyance mechanism is configured to receive one or more additional empty conveyance receptacles to increase capacity of the non-linear, unit-level sortation system.

18. The system as recited in claim 15, wherein the conveyance receptacles are configured to be removed from the conveyance mechanism to reduce capacity of the non-linear, unit-level sortation system.

19. A method, comprising:
   receiving a pick receptacle that includes units of heterogeneous items picked from inventory storage of a materials handling facility to fulfill a plurality of customer orders,
   associating individual units of inventory items, selected from the received units of heterogeneous items, to respective ones of a plurality of conveyance receptacles, and
   inducting one or more of the conveyance receptacles, respectively containing an associated individual unit of inventory item into a conveyance mechanism.

20. A system, comprising:
   one or more singulation stations configured to:
      associate individual units of inventory items, selected from a pick receptacle that includes units of heterogeneous items picked from inventory storage of a materials handling facility to fulfill a plurality of customer orders, to respective ones of a plurality of conveyance receptacles, and
      induct one or more of the conveyance receptacles, respectively containing an associated individual unit of inventory item into a conveyance mechanism.

\* \* \* \* \*